United States Patent
Tomita

(10) Patent No.: US 11,008,045 B2
(45) Date of Patent: May 18, 2021

(54) VEHICLE ROOF STRUCTURE

(71) Applicant: TOYOTA JIDOSHA KABUSHIKI KAISHA, Aichi-ken (JP)

(72) Inventor: Yasuhiro Tomita, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 71 days.

(21) Appl. No.: 16/574,086

(22) Filed: Sep. 18, 2019

(65) Prior Publication Data

US 2020/0094878 A1 Mar. 26, 2020

(30) Foreign Application Priority Data

Sep. 20, 2018 (JP) .............................. JP2018-176116

(51) Int. Cl.
*B62D 25/06* (2006.01)
*B60R 13/04* (2006.01)
*B62D 27/02* (2006.01)
*B62D 25/02* (2006.01)

(52) U.S. Cl.
CPC .............. *B62D 25/06* (2013.01); *B60R 13/04* (2013.01); *B62D 25/02* (2013.01); *B62D 27/023* (2013.01)

(58) Field of Classification Search
CPC ...... B62D 25/06; B62D 25/02; B62D 27/023; B60R 13/04
USPC .............. 206/210, 203.01, 203.03, 208, 1.08
See application file for complete search history.

(56) References Cited

U.S. PATENT DOCUMENTS 4,618,181 A * 10/1986 Tokuda .................. B62D 25/07
296/191
5,013,083 A * 5/1991 Yada ....................... B60R 13/04
296/210

FOREIGN PATENT DOCUMENTS

JP H3-35846 U 4/1991

* cited by examiner

*Primary Examiner* — Dennis H Pedder
(74) *Attorney, Agent, or Firm* — Hauptman Ham, LLP

(57) ABSTRACT

A vehicle roof structure includes a roof panel, a side member outer panel, and a roof side molding. The roof panel includes a flange portion superposed on and coupled with a top surface of a flange portion of the side member outer panel. The roof side molding engages with a plurality of clips and mounted on the flange portion. The flange portion includes raised portions protruding upward between the clips and facing a lower edge of the roof side molding in the vehicle height direction.

4 Claims, 4 Drawing Sheets

VEHICLE ROOF STRUCTURE

CROSS REFERENCE TO RELATED APPLICATION

This application claims priority to Japanese Patent Application No. 2018-176116 filed on Sep. 20, 2018, which is incorporated herein by reference in its entirety including the specification, claims, drawings, and abstract.

TECHNICAL FIELD

The present disclosure relates to a vehicle roof structure, and more particularly to a structure of a roof panel forming a center part of a roof of a vehicle.

BACKGROUND

Vehicles often include a roof having a roof panel forming a center part of the roof and an outside panel forming a side part of the roof that are coupled together. These vehicles employ a structure including a coupling portion formed in a groove shape extending along the length of the vehicle and a roof molding mounted along the groove to make the coupling portion externally invisible (see JP H03-35846 U, for example).

The roof molding disclosed in JP H03-35846 U includes a design portion disposed across the groove to bridge between a design surface of the roof panel and a design surface of the outside panel and thereby cover the coupling portion, and an elastic leg portion formed under the design portion and configured to be fitted into the groove. The roof molding is secured to the groove by pressing the elastic leg portion against side faces of the groove to fit the elastic portion into the groove. In this structure, a space formed between a leading edge of the elastic leg portion and the bottom face of the groove may allow downward deformation of the roof molding which is depressed from upward.

To address this problem, a roof molding may include an elastic leg portion having a leading edge with different heights between a portion to be assembled to a clip and the remaining portion. It is proposed, for example, that a clip prohibits downward deformation of the portion of the elastic leg portion assembled to the clip, and the remaining portion of the elastic leg portion is extended downward such that its lower edge comes into contact with the bottom face of the groove to thereby prohibit downward deformation of the roof molding.

This structure, however, requires that the roof molding should have a cross sectional shape which varies longitudinally, which complicates the shape of the roof molding and increases costs.

SUMMARY

An embodiment of the disclosure is therefore directed toward a simple roof panel structure which inhibits downward deformation of a roof molding.

In accordance with an aspect, a vehicle roof structure includes a roof panel forming a center part of a roof of a vehicle, a side member outer panel coupled to an outer end portion of the roof panel in a width direction of the vehicle and forming a roof side portion of the vehicle, and a roof side molding covering a coupling portion coupling the roof panel and the side member outer panel. In the vehicle roof structure, the outer end portion of the roof panel is superposed on and coupled with a top surface of an inner end portion of the side member outer panel in the width direction of the vehicle. The roof side molding engages with a plurality of clips attached on a top surface of the outer end portion of the roof panel and is mounted on the outer end portion. The roof panel is made of resin. The roof panel includes, on the outer end portion, a plurality of raised portions protruding upward of the vehicle between the clips and facing a lower edge of the roof side molding in a height direction of the vehicle.

The plurality of raised portions protruding upward of the vehicle formed in portions of the roof panel between the clips and facing the lower edge of the roof side molding may inhibit the lower edge of the roof side molding from coming into contact with the raised portions and deforming downward, when the roof side molding is depressed from upward between the clips. As the roof panel is made of resin, these raised portions may be easily formed. Further, the roof side molding having a longitudinally uniform cross sectional shape may simplify the structure of the roof side molding. It is thus possible to effectively inhibit downward deformation of the roof side molding with a simple structure.

In the vehicle roof structure of the disclosure, the roof panel may include, on the outer end portion, a plurality of recess portions that are concave downward of the vehicle, and the clips may be attached to the recess portions.

It is easy to mold the recess portions in the roof panel that is made of resin. Thus, this simple structure may inhibit displacement of the clips from predetermined positions when attaching the roof side molding.

In the vehicle roof structure, the roof side molding may be an elongated member having a uniform cross sectional shape.

This structure simplifies the structure of the roof side molding, making production of the roof side molding easier.

The present disclosure inhibits downward deformation of the roof side molding with a simple structure.

BRIEF DESCRIPTION OF DRAWINGS

Embodiment(s) of the present disclosure will be described based on the following figures, wherein.

DESCRIPTION OF EMBODIMENTS

A vehicle roof structure 100 according to an embodiment will be described by reference to the drawings. In each drawing, an arrow FR, an arrow UP, and an arrow RH indicate the forward direction (traveling direction), the upward direction, and the rightward direction of a vehicle, respectively. Directions opposite to these arrows FR, UP, and RH indicate the rearward direction, the downward direction, and the leftward direction of the vehicle, respectively. In the following description, unless otherwise specified, frontward and rearward, leftward and rightward, and upward and downward refer to frontward and rearward along the length of a vehicle, leftward and rightward along the width of the vehicle, and upward and downward along the height of the vehicle, respectively.

Figure 1:
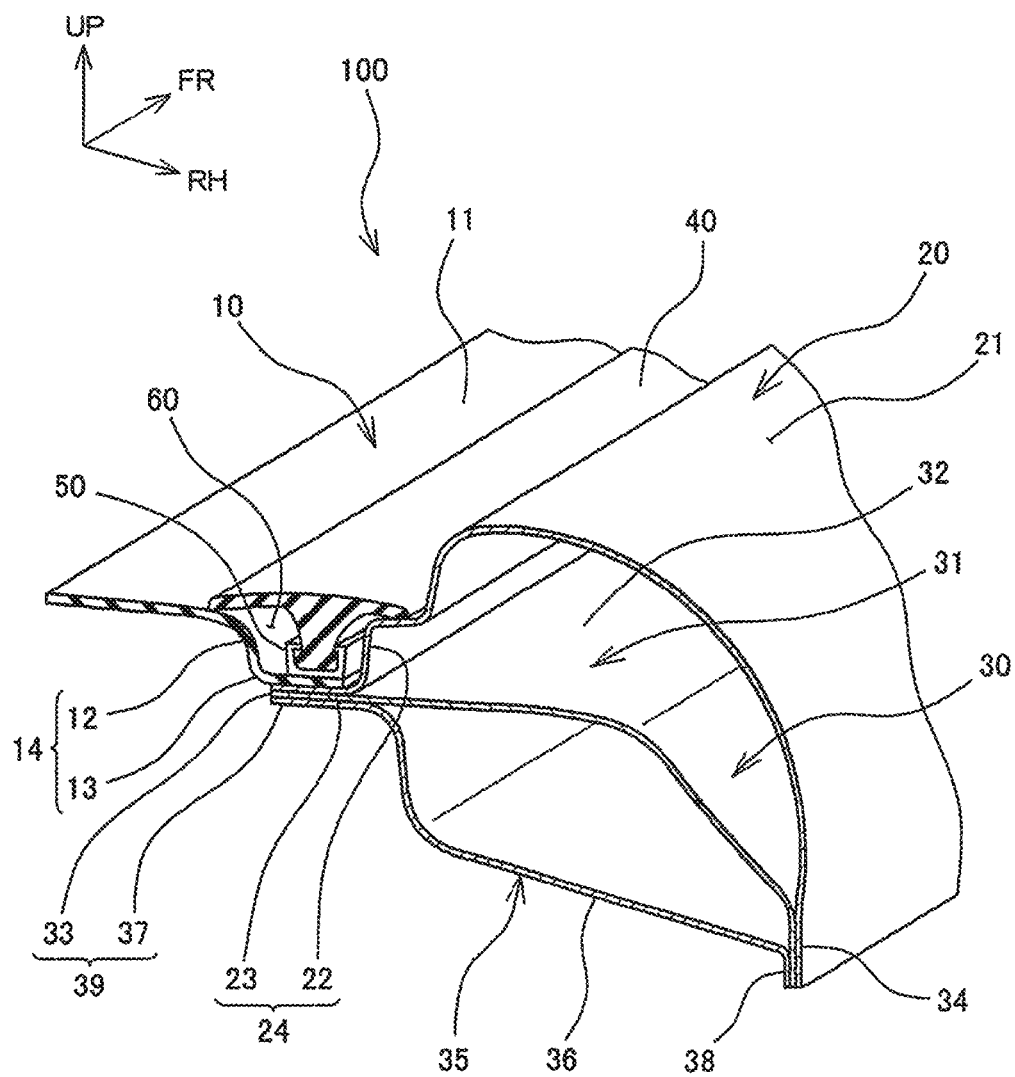
FIG. 1 is a perspective sectional view of a vehicle roof structure according to an embodiment.

As illustrated in FIG. 1, the vehicle roof structure 100 according an embodiment includes a roof panel 10, a side member outer panel 20, and a roof side molding 40.

The roof panel 10 is a plate member forming a center part of a roof of a vehicle. The roof panel 10 includes a design portion 11 forming an outer design surface of the roof of the vehicle, and an outer end portion 14 located outward in the vehicle width direction with respect to the design portion 11. The outer end portion 14 includes a standing plate portion 12 extending downward from an outer edge of the design portion 11 in the vehicle width direction, and a flange portion 13 extending outward along the vehicle width from a lower edge for the standing plate portion 12. The roof panel 10 is formed by resin molding.

The side member outer panel 20 is a metallic plate member forming a roof side and an upper part of a side face of the vehicle. The side member outer panel 20 includes a design portion 21 and an inner side portion 24 located inward in the vehicle width direction with respect to the design portion 21. The design portion 21 forms, together with the design portion 11 of the roof panel 10, a design surface of the roof side portion of the vehicle, and also forms a design surface of the upper part of the side face of the vehicle. The inner end portion 24 includes a standing plate portion 22 extending downward from an inward edge of the design portion 21 in the vehicle width direction, and a flange portion 23 extending inward along the vehicle width from a lower edge of the standing plate portion 22.

The flange portion 23 of the side member outer panel 20 is attached to an upper face of a flange portion 39 located inward in the vehicle width direction of the side member 30 including a side member outer panel 31 and a side member inner panel 35 that are joined together to form a closed section structure. The side member outer panel 31 includes a body part 32 curved upward, a flange portion 33 protruding inward along the vehicle width from the body part 32, and a lower flange portion 34 curving downward from the body part 32. The side member inner panel 35 is a metallic plate member including a body part 36 having an L shape cross section, a flange portion 37 extending inward of the vehicle from the inner edge of the body part 36 in the vehicle width direction, and a lower flange 38 located outward of the body part 36 along the vehicle width and curving and extending downward.

The flange portion 33 of the side member outer panel 31 and the flange portion 37 of the side member inner panel 35 are welded together to form a flange portion 39. The flange portion 23 of the side member outer panel 20 is welded to an upper surface of the flange portion 39. The lower flange portion 34 of the side member outer panel 31 and the lower flange portion 38 of the side member inner panel 35 are welded together, and the lower end portion of the side member outer panel 20 located outward along the vehicle width is welded to the outward face of the flange portion 34 in the vehicle width direction.

Figure 2A:
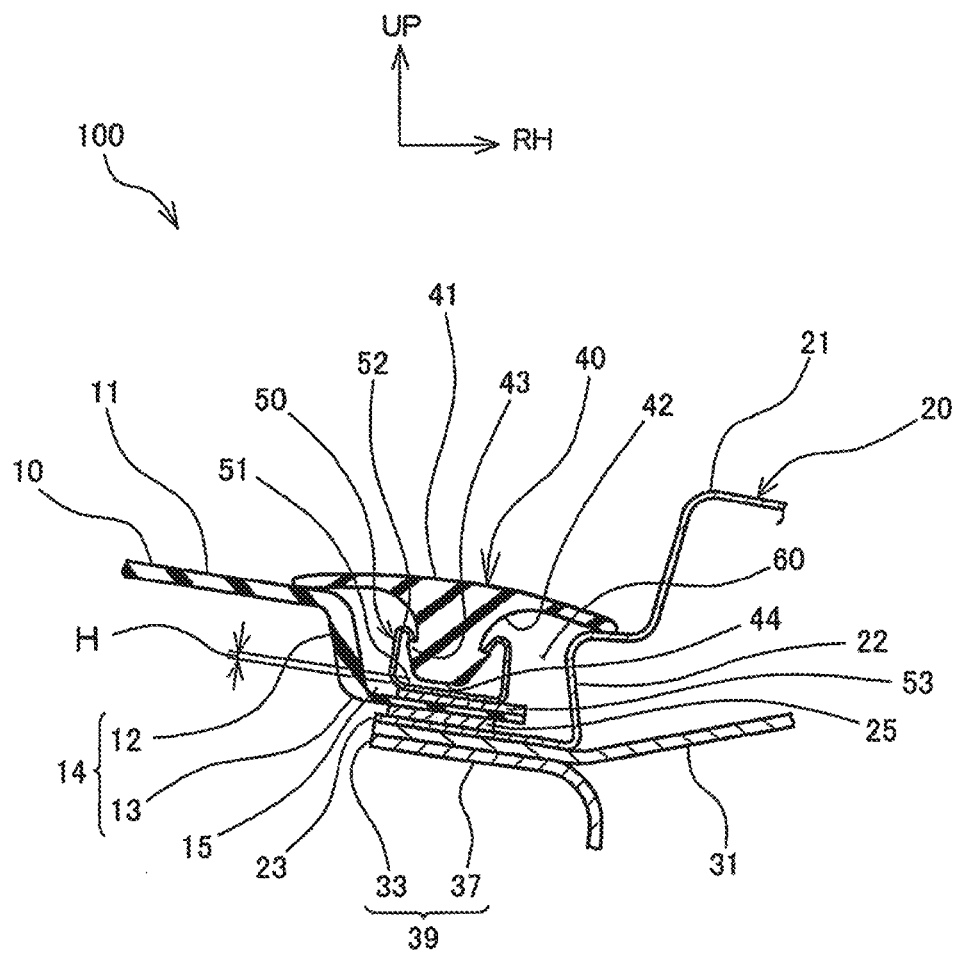
FIG. 2A is a sectional view of a portion to which a clip is attached in the vehicle roof structure according to the embodiment.

As illustrated in FIG. 2A, the flange portion 13 of the roof panel 10 is attached to a top surface of the flange portion 23 of the side member outer panel 20 by means of an adhesive 25. After the flange portion 13 of the roof panel 10 is attached to the top surface of the flange portion 23 of the side member outer panel 20, the standing plate portion 12 of the roof panel 10, the flange portion 13, the standing plate portion 22 of the side member outer panel 20, and the flange portion 23 together form a groove portion 60. The groove portion 60 is a coupling portion coupling the roof panel 10 and the side member outer panel 20.

The roof side molding 40 is mounted in the groove portion 60. The roof side molding 40 includes a design portion 41 disposed across the groove portion 60 by bridging between a surface of the design portion 11 of the roof panel 10 and a surface of the design portion 21 of the side member outer panel 20 to thereby cover the coupling portion, and a leg portion 42 extending downward of the design portion 41. The roof side molding 40 includes a protrusion 43 protruding in the vehicle width direction in the middle between the design portion 41 and a lower edge 44 of the leg portion 42. The roof side molding 40 is produced by extrusion molding of resin and is a longitudinal member having a uniform sectional shape.

Figure 2B:
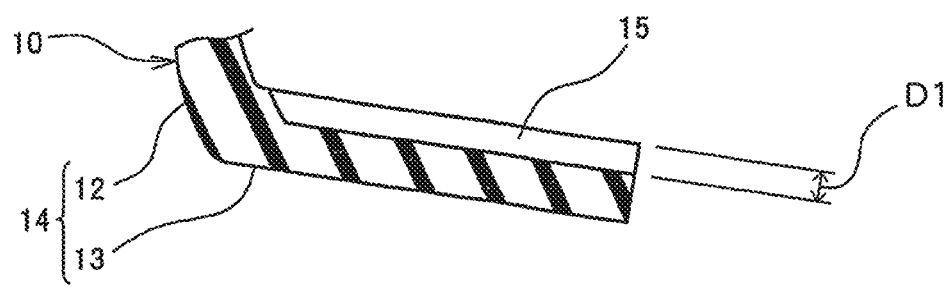
FIG. 2B is an enlarged sectional view of a recess portion formed in an outer end portion of a roof panel according to the embodiment.
Figure 4:
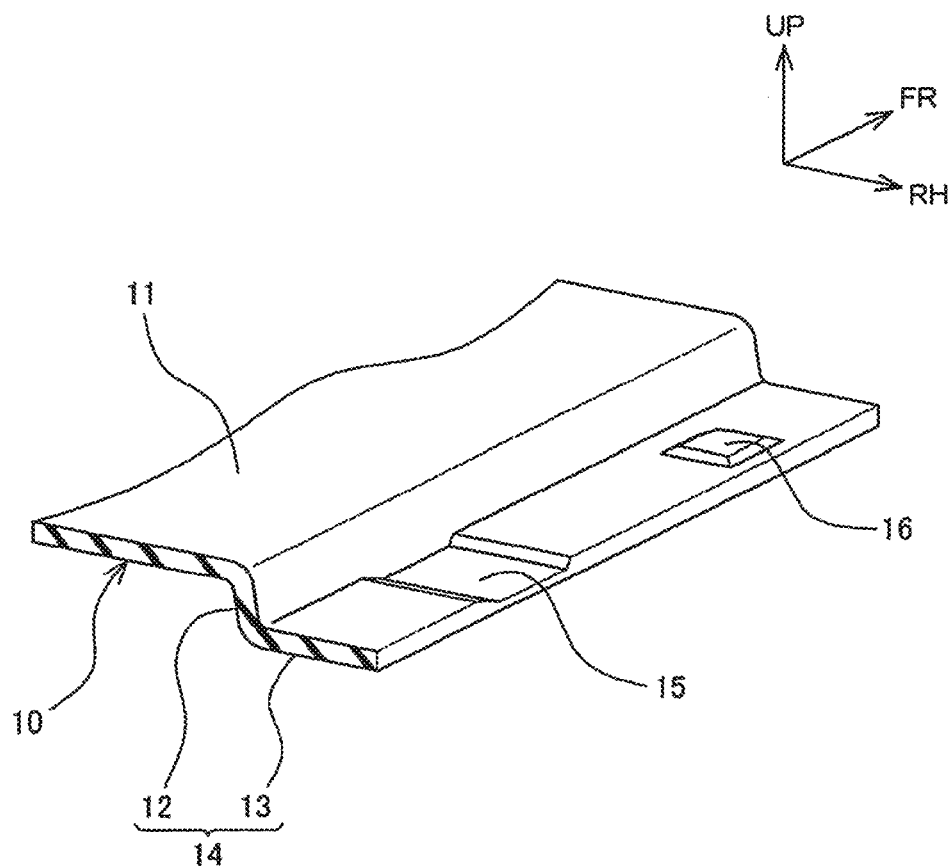
FIG. 4 is a perspective view illustrating the outer end portion of the roof panel of the vehicle roof structure according to the embodiment.

As illustrated in FIG. 4, the roof panel 10 includes, on an upper surface of the flange portion 13, a recess portion 15 which is concave downward of the vehicle. The recess portion 15 is molded when the roof panel 10 is formed by resin molding. As illustrated in FIG. 2B, the recess portion 15 has a depth of D1. The undersurface of the flange portion 13 opposite the recess portion 15 is a planar surface. The roof panel 10 includes a plurality of recess portions 15 on the flange portion 13 along the length of the vehicle.

A clip 50 is attached to a bottom surface of the recess portion 15 with an adhesive 53. The clip 50 includes a base portion 51 fitted into the recess portion 15 and fixed to a top surface of the recess portion 15 by the adhesive 53, and a hook 52 extending upward from the base portion 51. The hook 52 engages with the protrusion 43 formed on the leg portion 42 of the roof side molding 40 to mount and secure the roof side molding 40 on the flange portion 13 of the roof panel 10. When the roof side molding 40 is attached on the flange portion 13 of the roof panel 10 with the clip 50, a small space H is formed between the lower edge 44 of the leg portion 42 and the top surface of the base portion 51 of the clip 50.

As described above, the clip 50 is attached on each of a plurality of recess portions 15 disposed on the flange portion 13 of the roof panel 10 along the length of the vehicle, to thereby secure the roof side molding 40 to the flange portion 13 of roof panel 10 at a plurality of locations.

Figure 3A:
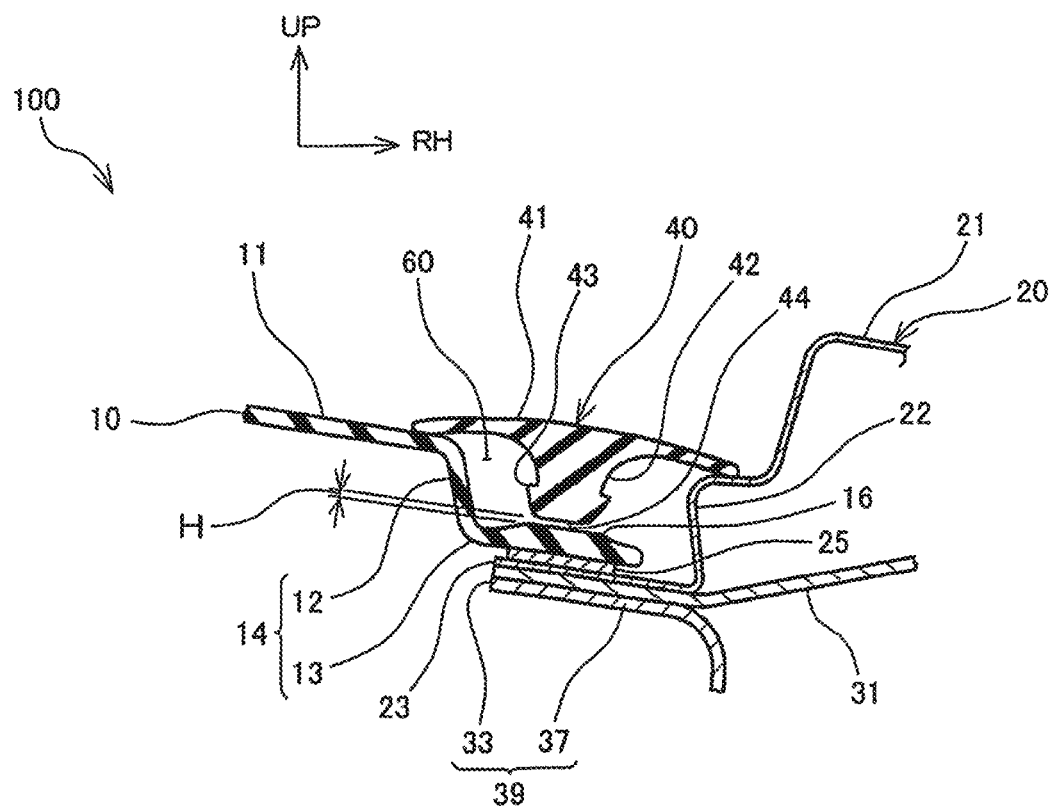
FIG. 3A is a cross sectional view of a portion where a raised portion is formed in the vehicle roof structure according to the embodiment.

As illustrated in FIG. 3A and FIG. 4, the roof panel 10 further includes, on the top surface of the flange portion 13, a raised portion 16 protruding upward of the vehicle. One or a plurality of raised portions 16 are disposed between the recess portions 15 to which the clips 50 are attached. Therefore, when the roof side molding 40 is mounted on the flange portion 13 of the roof panel 10 with the clips 50, the raised portions 16 are located between the clips 50. Similar to the recess portion 15, the raised portion 16 is also molded simultaneously with resin molding of the roof panel 10.

Figure 3B:
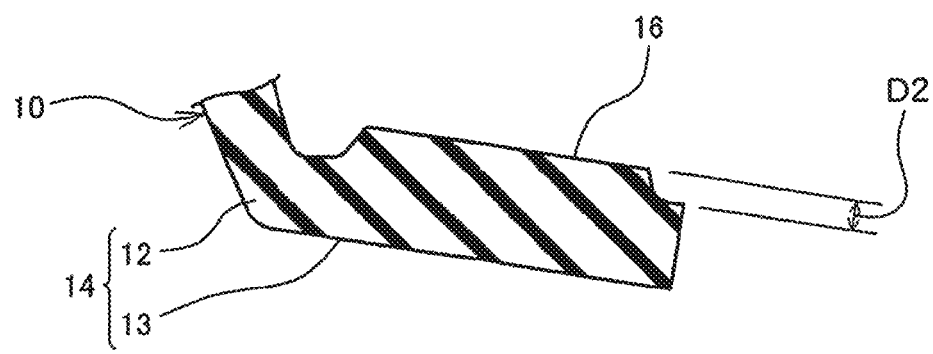
FIG. 3B is an enlarged cross sectional view of the raised portion formed in the outer end portion of the roof panel in the vehicle roof structure according to the embodiment.

As illustrated in FIG. 3B, the height of the raised portion 16 is D2. The undersurface of the flange portion 13 opposite the raised portion 16 is a planar surface. When the roof side molding 40 is mounted on the flange portion 13 of the roof panel 10 with the clips 50, the raised portion 16 faces the lower edge 44 of the roof side molding 40, and a small space H is formed between the lower edge 44 of the leg portion 42 and the top surface of the raised portion.

In the vehicle roof structure 100 described above, when the roof side molding 40 is depressed from above, in portions of the roof side molding 40 where the clips 50 are attached, the lower edge 44 of the roof side molding 40 moves downward slightly and comes into contact with the top surface of the base portion 51 of the clip 50, whereas in portions of the roof side molding 40 between the clips 50, the lower edge 44 of the roof side molding 40 slightly moves downward and comes into contact with the top surface of the raised portion 16. This structure thus inhibits downward deformation of the roof side molding 40.

This structure thus reduces downward deformation of the lower edge 44 of the roof side molding 40 even when the roof side molding 40 is formed by extrusion molding in an elongated member having a uniform cross section. As the roof panel 10 is made of resin, the raised portion 16 can be easily molded simultaneously with the resin molding of the roof panel 10. It is therefore possible to reduce downward deformation of the lower edge 44 of the roof side molding 40 with a simple structure. Simplified structure of the roof side molding 40 further reduces the manufacturing cost of the roof side molding 40.

The clip 50 which is fitted into the recess portion 15 and secured thereto may prevent misalignment during mounting.

Further, the undersurface of the flange portion 13 of the roof panel 10, which is a planar surface, may be easily fixed on the flange portion 23 of the side member outer panel 20 with the adhesive 25.

The invention claimed is:

1. A vehicle roof structure comprising:
a roof panel forming a center part of a roof of a vehicle;
a side member outer panel coupled to an outer end portion of the roof panel in a width direction of the vehicle, the side member outer panel forming a roof side portion of the vehicle; and
a roof side molding covering a coupling portion coupling the roof panel and the side member outer panel, wherein
the outer end portion of the roof panel is superposed on and coupled with a top surface of an inner end portion of the side member outer panel in the width direction of the vehicle,
the roof side molding engages with a plurality of clips attached on a top surface of the outer end portion of the roof panel and is mounted on the outer end portion,
the roof panel is made of resin, and
the roof panel includes, on the outer end portion, a plurality of raised portions protruding upward of the vehicle between the clips and facing a lower edge of the roof side molding in a height direction of the vehicle.

2. The vehicle roof structure according to claim 1, wherein
the roof panel includes, on the outer end portion, a plurality of recess portions that are concave downward of the vehicle, and
the clips are attached to the recess portions.

3. The vehicle roof structure according to claim 1, wherein,
the roof side molding is an elongated member having a uniform cross sectional shape.

4. The vehicle roof structure according to claim 2, wherein,
the roof side molding is an elongated member having a uniform cross sectional shape.

* * * * *